(12) United States Patent
Delvaux

(10) Patent No.: US 6,718,419 B1
(45) Date of Patent: Apr. 6, 2004

(54) SYSTEM AND METHOD FOR EXTENDING THE NUMBER OF ADDRESSABLE PHYSICAL DEVICES ON A DATA BUS

(75) Inventor: Marc Delvaux, Eatontown, NJ (US)

(73) Assignee: Globespanvirata, Inc., Red Bank, NJ (US)

(*) Notice: Subject to any disclaimer, the term of this patent is extended or adjusted under 35 U.S.C. 154(b) by 451 days.

(21) Appl. No.: 09/702,468

(22) Filed: Oct. 31, 2000

Related U.S. Application Data

(60) Provisional application No. 60/166,110, filed on Nov. 17, 1999.

(51) Int. Cl.$^7$ .............................................. G06F 13/00
(52) U.S. Cl. ........................ 710/305; 370/392; 370/475
(58) Field of Search ................................ 710/100, 107, 710/305; 370/351, 362, 392, 395.1, 395.3, 402, 475

(56) References Cited

U.S. PATENT DOCUMENTS

| | | | |
|---|---|---|---|
| 4,521,644 A | * 6/1985 | Bernard, Jr. .............. | 379/90.01 |
| 5,485,456 A | * 1/1996 | Shtayer et al. ........... | 370/395.1 |
| 6,147,997 A | * 11/2000 | Holden et al. ........... | 370/395.1 |

* cited by examiner

*Primary Examiner*—Glenn A Auve
(74) *Attorney, Agent, or Firm*—Thomas, Kayden, Horstemeyer & Risley

(57) ABSTRACT

A data bus address extender is presented. The data bus extender may be deployed in cooperation with a master device to extend the number of addressable physical devices on a data bus without modifying the number of address bits used to identify the various slave devices on the bus. The data bus extender of the present invention can be used in existing data bus systems with minimal impact as it does not require a change at the slave devices. A data bus address extender in accordance with the present invention may comprise an address stripper and a range select decoder wherein at least one of the address bits at the slave side of the bus is enabled by the range select decoder. The present invention also provides a method for extending the number of addressable communication devices on a data bus. In its broadest terms, the method can be described by the following steps: receiving an address at a master device; subdividing the addressable slave devices into a plurality of ranges; identifying an appropriate range in response to a first portion of the address; identifying a particular device within the identified range responsive to a second portion of the address; selecting an uniquely identified addressable slave device by enabling the address lines; and performing the data transfer.

27 Claims, 8 Drawing Sheets

SYSTEM AND METHOD FOR EXTENDING THE NUMBER OF ADDRESSABLE PHYSICAL DEVICES ON A DATA BUS

CROSS-REFERENCE TO RELATED APPLICATION

The present application claims the benefit of co-pending U.S. provisional patent application, issued Ser. No. 60/166,110, and filed Nov. 17, 1999, which is hereby incorporated by reference in its entirety.

FIELD OF THE INVENTION

The present invention generally relates to high-speed data communications. More specifically, the invention relates to a system and method for extending the number of addresses on a data bus without increasing the number of address control bits used to identify a particular addressable device on the data bus.

BACKGROUND OF THE INVENTION

The present communications infrastructure supporting voice, video, and data networks is founded on technology that is over 30 years old. In spite of their age, these networks have served the telecommunications industry well, even in recent times, for they provide a cohesive foundation on which to build the modern telecommunications infrastructure. In the early 1970s, packet switching technology was introduced to support emerging data networks. At about the same time packet switching networks were being deployed, the International Telecommunications Union-Telecommunications Standard Sector (ITU-T, formerly the CCITT) published the X.25 specification. X.25 defines the procedures for computers to communicate with network machines (packet switches) and to transport data to other computers. X.25 has become a widely used industry standard. X.25 was designed for the data systems that operate at only a few bits per second or a few hundred bits per second. Although X.25 can be placed on very-high speed media and can operate quite efficiently at these relatively high speeds, a substantial amount of subscriber equipment and software has been designed for modest data transfer rates. With ever increasing processing speed of today's personal computers and other data transfer devices, greater transfer rates are in demand.

This demand for increased transfer rates in data communications networks, the advent of relatively error-free high-capacity networks, and the implementation of very powerful end-user workstations has led to a criticism of the overhead and redundancy built into the X.25 protocol. For example, sequencing and flow control, as well as, positive acknowledgements and negative acknowledgements are performed at least twice in accomplishing data transfers with X.25.

In response, most of today's emerging technology is based on the idea of relaying data traffic as quickly as possible. This concept is often called fast packet relay or fast packet switching. Currently, both frame relay and cell relay are popular forms for transporting data traffic. In contrast to frame relay, cell relay uses a fixed length protocol data unit (PDU) called a cell. Cell relay presents an integrated solution to networking in that it supports the transmission and reception of voice, video, data, and other applications. This capability is of particular interest to large companies that may have developed multiple networks to handle different data transmission schemes.

Asynchronous transfer mode (ATM) is a popular cell relay protocol designed to provide a high speed, low-delay multiplexing and switching network protocol to support any type of user traffic. ATM segments and multiplexes user traffic into small, fixed length cells comprising a header and a user payload. ATM provides no error detection on the contents of the user payload. In addition, ATM provides no retransmission services and very few operations are performed on the header. The intention of this approach—small cells with minimal services—is to implement a network fast enough to support multi-megabit transfer rates.

Multiple protocols are required to support full ATM operations. The number of protocols required depends upon where the user traffic is being transported. For example, data traffic may traverse user network interfaces (UNIs), network node interfaces (NNIs), data exchange interfaces (DXIs), and frame user network interfaces (FUNIs). The UNI is the most visible protocol, because it defines the procedures for the internetworking between the user equipment and an ATM node. Two forms of UNIs are supported, a private UNI and a public UNI. The major difference between the private and the public UNI pertains to the physical communications links between the machines. A twisted-pair or a private fiber will typically support a private link, whereas, a public UNI will typically consist of a DS3, or a synchronous digital hierarchy/synchronous optical network (SDH/SONET) communications link.

The ATM Forum is a standards body charged with promulgating operational standards, which support all the various data transfers (protocols) in an ATM based data network. The Universal Test & Operations Physical Interface for ATM (UTOPIA) represents just one of many operational standards that support ATM data transfers in ATM networks. The ATM Forum has approved four versions of the UTOPIA standard. They are commonly known as UTOPIA-Levels 1 through 4. Hardware devices compliant with the UTOPIA-Level 3 standard are just becoming commercially available. UTOPIA-Level 4 devices are still under development.

The UTOPIA-Level 2 standard introduced at least two important changes to the original UTOPIA-Level 1 standard. First, Level 2 increased the bandwidth to support at least 622.08 Mbps, the bandwidth of STS12/STM4 in the SDH/SONET hierarchy. This change was implemented by increasing the width of the data path to 16 bits and the operating frequency to support timing specifications of 25, 33, and 50 MHz. Second, Level 2 introduced addressing capabilities to support the interaction of multiple physical layer devices to the same ATM layer device. This modification is especially important for "last mile" links to end-user devices where multiple digital subscriber line (xDSL) communication systems (each with a relatively low bandwidth per physical device) are used to traverse the gap between the ATM layer device and the end-user device(s). The standard version of the UTOPIA Level 2 addressing scheme suffers from at least two shortcomings: the address scheme supports only thirty-two addresses and one of the addresses is reserved for a "dummy" device to avoid bus contention.

In light of the expected implementation and operational cost erosion for all data interface technologies, it is highly desirable to identify and implement communication links that exhibit increased performance with minimal added cost and complexity. With this goal in mind, there is a need for an improved system and method that can increase the bandwidth of a communication link between two computing devices at the interface between an ATM layer device and various available physical layer transport links while minimizing installation and operational complexity, space requirements, and cost.

SUMMARY OF THE INVENTION

In light of the foregoing, the invention is a system and a method for extending the number of addresses on a data bus without modifying the number of address bits (address lines) used to identify the various devices on the data bus. An improved ATM network node configured with a data bus extender in accordance with the present invention may achieve an overall higher level of data transfer efficiency by increasing the number of addressable physical layer transport devices that may communicate with an ATM layer device. The ATM network node of the present invention achieves increased performance with a minimal hardware investment at the source or ATM layer device. A data bus extender in accordance with the present invention may comprise an address stripper and a range select decoder wherein at least one of the address bits at the slave or physical layer device side is enabled by the range select decoder.

The present invention can also be viewed as providing a method for extending the number of addressable communication devices on a data bus. In its broadest terms, the method can be described by the following steps: receiving an address at a master device; subdividing the addressable slave devices into a plurality of ranges; identifying an appropriate range in response to a first portion of the address; identifying a particular device within the identified range responsive to a second portion of the address; selecting an uniquely identified addressable slave device by enabling the address lines; and performing the data transfer.

Other features and advantages of the present invention will become apparent to one skilled in the art upon examination of the following drawings and detailed description. It is intended that all such additional features and advantages be included herein within the scope of the present invention, as defined by the claims.

BRIEF DESCRIPTION OF THE DRAWINGS

The present invention will be more fully understood from the detailed description given below and from the accompanying drawings of the preferred embodiment of the invention, which however, should not be taken to limit the invention to the specific embodiments enumerated, but are for explanation and for better understanding only. Furthermore, the drawings are not necessarily to scale, emphasis instead being placed upon clearly illustrating the principles of the invention. Finally, like reference numerals in the figures designate corresponding parts throughout the several drawings.

DETAILED DESCRIPTION OF THE PREFERRED EMBODIMENTS

It is significant to note that the system and method for extending the number of addresses on a data bus are presented in association with a particular exemplary implementation at an UTOPIA Level 2 interface between an ATM layer device (e.g., a network node) and a plurality of physical layer devices (e.g., xDSL communication systems). Both the system and the method for extending the number of addresses on a data bus in accordance with the present invention may be applied to different systems where it would be desirable to extend the number of addresses on a data bus.

An ATM network node configured with a data bus extender in accordance with the present invention may be useful in implementing the "last mile" in an ATM switching network. In other words, the capability to further extend the number of addressable physical devices at an UTOPIA Level 2 interface may provide for more efficient use of the ATM layer device by permitting its full bandwidth to be applied across a plurality of lower bandwidth physical layer communication links. In the specific example of an ATM network node in communication with a plurality of xDSL communication systems, the existing xDSL integrated circuits at the physical layer may be bundled. As a result, the reuse of existing components necessary to implement a plurality of xDSL communication systems between an ATM network node and one or more remotely located computing devices, simplifies the implementation as only a data bus address line extender needs to be added at the ATM network node.

Figure 1:
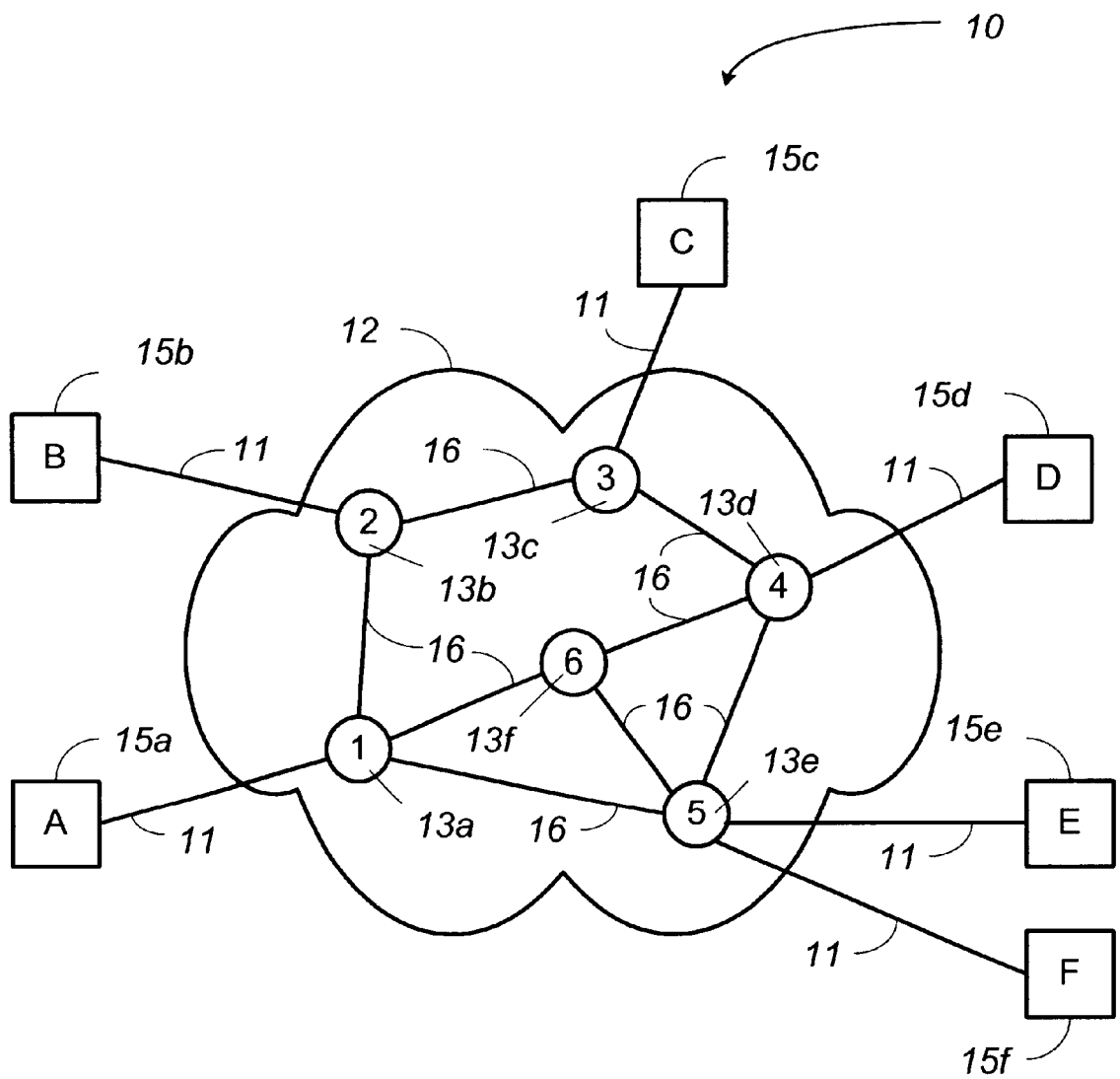
FIG. 1 is a schematic diagram illustrating a multi-node ATM switching communications system.

For transmission of data beyond a local area, communication is typically achieved by transmitting data from source to destination computing devices through a network of intermediate switching nodes. These nodes are not concerned with the content of the data; rather their purpose is to provide a switching facility that will transport the data from node to node until the data reaches its target destination (e.g., a computing device). FIG. 1 illustrates a communication network 10 that uses a plurality of ATM switching nodes to transfer data to and from a plurality of computing devices. More specifically, the communication network 10 comprises a plurality of computing devices 15a–15f, herein labeled, "A," "B," "C," "D," "E," and "F" in communication with each other via communication links 11 and an ATM switching network 12. As illustrated in FIG. 1, the ATM switching network 12 comprises a plurality of ATM nodes 13 in communication with each other via a plurality of communication links 16. It will be appreciated that the communication links 16 may comprise a plurality of singular or grouped T1, T3, E1, E3, synchronous optical network (SONET) or other data communication links. As illustrated the ATM switching network 12 may comprise a plurality of ATM nodes 13a, 13b, 13c, 13d, 13e, and 13f. In the exemplary communication network 1 the ATM nodes are labeled "1," "2," "3," "4," "5," and "6."

As also illustrated in FIG. 1, the ATM switching network 12 may be configured such that a number of different physical pathways formed by the various communication links 16 may be traversed by data transfers between any of the various computing devices 15. For example, data packets originating from computing device 15a, herein labeled, "A" may be communicated along a first communication link 11 to a first ATM node "1" 13a. As shown, ATM node "1" 13a may be in communication with three other ATM nodes "2," "5," and "6" 13b, 13e, and 13f, respectively. As further illustrated in FIG. 1, the remaining ATM network nodes 13c and 13d, labeled "3" and "4," respectively may be in communication with ATM nodes 13b, 13e, and 13f. As a result, each of the other computing devices 15b, 15c, 15d, 15e, and 15f may receive one or more data packets originating from computing device 15a via the ATM switching network 12 and the various communication links 11 that interconnect each of the computing devices 15 to an ATM network node 13.

In a well known manner, a cell stream originating at computing device 15b (B) and having cell headers that designate computing device 15d (D) as their destination, may be transmitted along communication link 11 to ATM node 13b of the ATM switching network 12. ATM node 13b uses information in the cell header of each of the cells comprising the cell stream to identify an appropriate destination ATM node 13. In the case of computing device 15d, the appropriate ATM network node 13 is ATM network node 13d, labeled, "4." Those skilled in the art will appreciate that individual cells may traverse the ATM switching network 12 via the path identified by ATM network nodes 13, labeled "2," "3," and "4." Alternatively, other cells may traverse ATM network nodes 13, labeled "2," "1," "6," and "4," or other various paths starting with ATM network node "2" 13b and ending with ATM network node "4" 13d.

Having been properly transferred from a first or source ATM network node "2" 13b to a second or destination ATM node "4" 13d within the ATM switching network 12, the individual cells within the cell stream are then transmitted from the second ATM network node "4" 13d via the communication link 11 to the computing device 15d (D). It will be appreciated that the communication system 10 may be used to transmit video, voice, and text data between each of the interconnected computing devices 15. It will be further appreciated that the communication system 10 may comprise bi-directional communication links 11 and bi-directional ATM nodes 13 to permit simultaneous video, voice, and text data transfers to and from each of the computing devices coupled to the ATM switching network 12.

It is significant to note that the ATM switching network 12 is presented for simplicity of illustration and description, with a limited number of ATM network nodes 13 and ATM switching network communication links 16. Those skilled in the art will appreciate that in more practical configurations an ATM switching network 12 may comprise any number of ATM network nodes 13 and ATM switching network communication links 16 necessary to communicatively couple remotely located computing devices 15.

A digital subscriber line (DSL) communication system is but one example of a number of communication systems that may simultaneously transmit and receive digital data between two locations. Since a DSL communication system is capable of both transmitting and receiving digital data, a DSL communication system may serve as the communication link 11 between an ATM node 13 in an ATM switching network 12 and a computing device 15. In a xDSL communication system, where the acronym xDSL is used to identify a plurality of DSL data transfer standards, data is transmitted from a central office (CO) of the public switched telephone network (PSTN) to a customer premise (CP) via a transmission line, such as a two-wire twisted pair, and is transmitted from the CP to the CO as well, either simultaneously or in different communication sessions. The same transmission line might be utilized for data transfers by both sites or the transmission to and from the CO might occur on two separate lines.

With xDSL transceivers, the maximum usable data rate may be determined by a number of factors. A first factor, the transceiver technology, may comprise the digital encoding and modulation scheme of the underlying xDSL communications standard, as well as, amplifier efficiency, and noise immunity associated with the hardware used to realize the xDSL transceiver. A second factor may comprise the quality and distance of the twisted-pair telephone line comprising a local telephone service subscriber loop used to provide a data transmission medium between a xDSL transceiver in a CO and an associated CP-xDSL transceiver. A third factor may comprise the relative strength of radio-frequency transmissions that may interfere with the xDSL frequency range. With rate adaptive DSL communications systems, such as ADSL, slower data rates can be traded in exchange for increased distances between COs and remotely located CPs.

In order to achieve higher data rates with a fixed distance or with a given non-rate adaptive DSL transceiver technology, two or more DSL lines may be combined. By way of example, high-speed DSL (HDSL) technology uses two pairs of twisted copper wire, HDSL transceivers, multiplexers and demultiplexers at each end of a communication link to provide T1 capacity service over two pairs of twisted copper conductors commonly used in local subscriber loops within the PSTN.

In order to take full advantage of the relatively higher bandwidth capability of today's higher speed ATM switching nodes 13 it would be desirable to extend the number of physical layer devices that may be addressed by ATM layer devices (e.g., the ATM network nodes 13 of FIG. 1) configured to use the UTOPIA Level 2 standard for ATM layer to physical layer data transfers. A method for extending the number of addresses on a data bus in accordance with the present invention provides a uniform and scalable solution for transferring data between a relatively high bandwidth data transfer device and a plurality of lower bandwidth data transfer devices. Before focusing on the system and method of the present invention, an explanation follows concerning standard data transfers between data processing devices.

The Reference Model for Open Systems Interconnection

Figure 2:
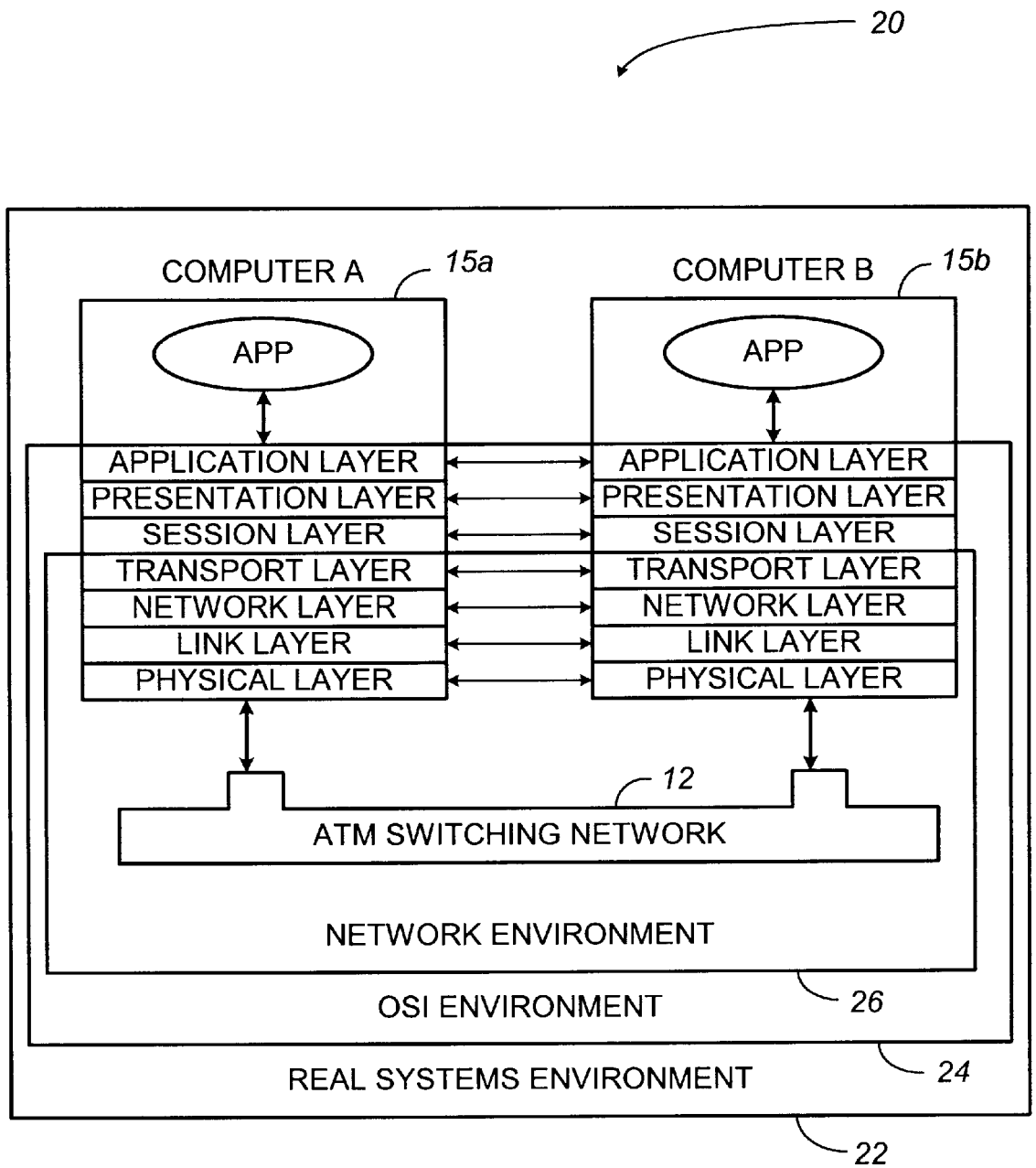
FIG. 2 is a schematic diagram illustrating the operational environments in the International Standards Organization (ISO) reference model for open systems interconnection (OSI) between computing devices, such as the computing devices interconnected by the multi-node ATM switching communications system of FIG. 1.

FIG. 2 is a diagram illustrating the operational environments in the International Standards Organization (ISO) reference model for open systems interconnection (OSI). As illustrated in the ISO reference model for OSI shown in FIG. 2, a network communication link 20 may be established between a first computer 15a, herein labeled, "computer A" and a second computer 15b, herein labeled, "computer B," when the computers 15a, 15b are coupled to a data network such as the multi-node ATM switching network 12 of FIG. 1. A communication system may comprise a complex configuration of both hardware and software. Early attempts at implementing software for such systems were often based on a single, complex, and unstructured program with many interacting components. The resulting software was difficult to test, troubleshoot, and modify.

To overcome these problems, the ISO adopted a layered approach in creating a reference model for data communications systems. The complex communication system is broken down into multiple layers, each of which performs a well-defined function. Conceptually, the layers can be considered as performing one of two generic functions, either network-dependent functions or application-oriented functions. The functional breakdown defining network functions and application-oriented functions gives rise to three distinct operational environments: the network environment 26, the OSI environment 24, and the real-systems environment 22.

The network environment 26 is concerned with the protocols and standards relating to the different types of underlying data communication networks. The OSI environment 24 encompasses the network environment 26 and adds additional application oriented protocols and standards to allow end user systems (i.e., the computers 15a, 15b) to communicate with one another. The real-systems environment 22 builds on the OSI environment 24 and is concerned with an individual manufacturer's proprietary software and services developed to perform a particular distributed information processing task.

As further illustrated in FIG. 2, both the network-dependent and the application-oriented components of the OSI model are operative within computers 15a, 15b and are represented as a number of layers. Each layer performs a well-defined function in the context of the network communication link 20. Each layer operates according to a defined protocol by exchanging messages, both user data and additional control information, with a corresponding peer layer in a remote system (i.e., the computers 15a, 15b). This concept is illustrated in FIG. 2 by way of the two-headed horizontal arrows between each of the respective layers. Each layer has a defined interface between itself and the adjacent layers both above and below. Consequently, the implementation of a particular protocol layer is independent of all other layers.

As shown in FIG. 2, the logical structure of the ISO reference model is made up of seven protocol layers. The three lowest layers, the network layer, the link layer, and the physical layer, are network dependent and are concerned with the protocols associated with the data communication network being used to link the computers 15a, 15b. In contrast, the three upper layers, the application layer, the presentation layer, and the session layer, are application-oriented and are concerned with the protocols that allow two end-user application processes (computer programs) to interact with each other. The intermediate transport layer masks the upper level application-oriented layers from the details of the lower network-dependent layers. Essentially, the transport layer builds on services provided by the network-dependent layers to provide the application-oriented layers with a network independent message interchange service.

Figure 3:
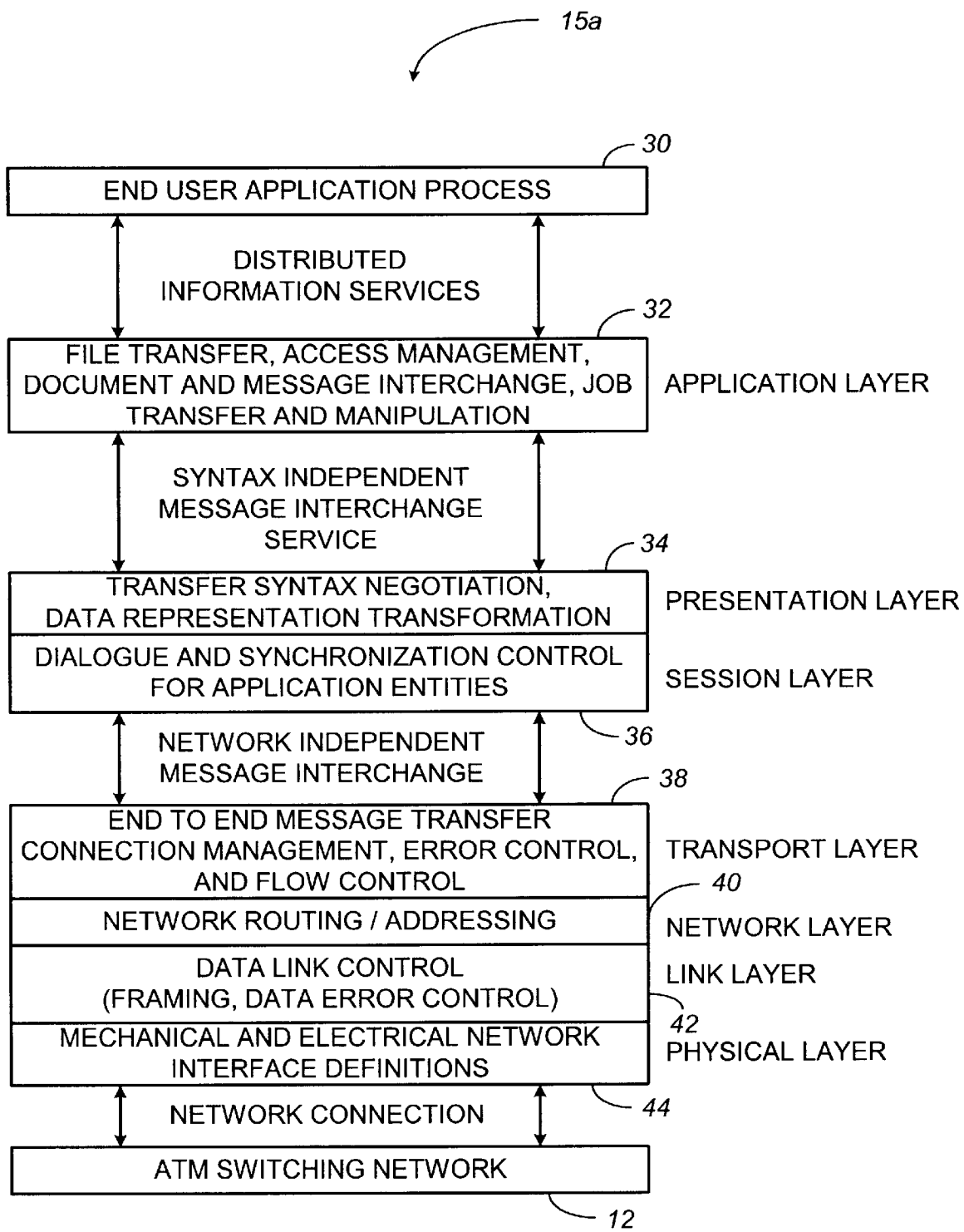
FIG. 3 further illustrates the protocol layers between the data network and computer A illustrated in FIGS. 1 and 2.

Having described the ISO reference model for OSI with regard to FIG. 2, reference is now directed to FIG. 3. In this regard, FIG. 3 further illustrates the functionality imbedded within the seven layers between the first computer 15a and the ATM switching network 12 introduced in FIG. 1.

As illustrated in FIG. 3, the protocol layers within the first computer 15a are as follows: the application layer 32, the presentation layer 34, the session layer 36, the transport layer 38, the network layer 40, the link layer 42, and the physical layer 44. The function of each of the seven layers introduced with regard to the reference model for OSI in FIG. 2 is specified formally as a protocol that defines the set of rules and conventions used by each layer to communicate with a peer layer in a remote computer 15b (not shown). Each layer provides a set of services to the layer immediately above. It also uses the services provided by the layer immediately below to transport the message units associated with the protocol to the remote peer layer. By way of example, the transport layer 38 provides a network-independent message transport service to the session layer 36 above it and uses the service provided by the network layer 40 below it, to transfer the set of message units associated with the transport protocol to a transport layer 38 located in the second (remote) computer 15b (see FIG. 2).

Application-Oriented Layers
The Application Layer

The application layer 32 provides the user interface between an end-user application process 30 (i.e., a computer program) and a range of networking distributed information services as illustrated in FIG. 3. Such services may take the form of file transfer, access, and management, as well as, general document and message interchange services such as electronic mail.

Access to application services is normally achieved through a defined set of primitives, each with associated parameters, which are supported by the local operating system. The access primitives function similarly to other well-known operating system calls and result in an appropriate operating system procedure being activated. These operating system calls use the communication system (software and hardware) as if it were a local device within its own computer, such as a hard disk drive controller. The detailed operation of the communication system below is transparent to the computer user and to the application layer 32. When the application process is performed, one or more parameters are returned indicating the status of the process attempted (success or otherwise). In addition to information transfer, the application layer 32 provides such services as: identification of one or more intended destination devices; determination of the availability of the one or more destination devices; establishment of authority to communicate; agreement on privacy (encryption techniques) mechanisms; authentication of the intended one or more destination devices; selection of a dialogue discipline; agreement on the responsibility for error recovery; and identification on constraints for data syntax. For simplicity of illustration, the aforementioned application layer 32 functions are designated file transfer, access management, document and message interchange, job transfer and manipulation as shown in FIG. 3.

The Presentation Layer

The presentation layer 34 is concerned with the syntax of data during data transfer between communicating end-user application processes 30. To achieve a true OSI compatible data transfer, a number of abstract data syntax forms have been defined for use by end-user application processes 30 together with associated transfer syntaxes. The presentation layer 34 negotiates and selects an appropriate transfer syntax to be used during the course of a particular transaction to maintain data integrity between the two end-user application processes 30.

To illustrate the services performed by the presentation layer, consider a telephone conversation between individuals that speak separate and distinct languages. Assume that each speaker uses an interpreter and that the only common language between the interpreters is English. In order to facilitate communication, each interpreter must translate from his or her local language to English and vice versa. The two speakers are analogous to two end-user application processes 30 with the two interpreters representing the presentation layer. Both local syntaxes (the local languages), as well as, a common syntax (English) are used by the parties to communicate. It is important to note that there must be a universally understood language, which must be defined and used by the interpreters in order for the speakers to communicate.

Another function of the presentation layer 34 is concerned with data security. In some applications, data sent by an end-user application process 30 is first encrypted using a key, which is known by the intended recipient of the data. The recipient decrypts any received data using the key before passing the data to the destination end-user application process 30.

The Session Layer

The session layer 36 provides a means to enable two application layer protocol entities to organize and synchronize their dialogue and manage the data exchange. It is thus responsible for setting up and clearing a communication channel between two communicating application layer protocol entities (actually presentation layer protocol entities) as illustrated in FIG. 3.

A number of optional services are provided, including the following: interaction management (duplex/half-duplex); synchronization, for managing data transfers when a data fault is encountered; and exception reporting when an unrecoverable fault is encountered during a data transfer.

Interface Between the Application-Oriented Layers and the Network-Dependent Layers The Transport Layer The transport layer 38 provides an interface between the higher application-oriented layers and the underlying network-dependent layers. It provides the session layer 36 with a message transfer facility that is independent of the underlying network type. By providing the session layer 36 with a defined set of message transfer facilities, the transport layer 38 hides the detailed operation of the network layer 40 from the session layer 36.

The transport layer 38 offers a number of service classes, which cater to the varying Quality of Service (QoS) levels provided by different types of networks. There are five service classes ranging from class 0, which provides only basic functionality required to establish a connection and perform a data transfer, to class 4, which provides full error control and flow control procedures. By way of example, a class 0 data transfer may be selected for use with a packet-switched data network, whereas, a class 4 data transfer may be selected for use with a local area network (LAN).

Network-Dependent Layers

The lowest three layers of the ISO reference model are network dependent, as such their detailed operation varies from one network type to another. However, some generalities can be made as further illustrated in FIG. 3.

The Network Layer

The network layer 40 is responsible for establishing and clearing a network wide connection between to two transport layer protocol entities. It includes such facilities as network routing and addressing and, in some instances, flow control across the computer to network interface. In the case of internetworking, the network layer 40 provides various harmonizing functions between the interconnected networks.

The Link Layer

The link layer 42 builds on the physical connection provided by an exemplary data network such as the ATM switching network 12 of FIG. 1, to provide the network layer 40 with a reliable information transfer facility. The link layer 42 is responsible for error detection, and in the event of transmission errors, the retransmission of messages. Two types of service are provided: connectionless service treats each information frame as a self-contained entity that is transferred using a best-try approach; and connection oriented service endeavors to provide an error-free information transfer facility.

The Physical Layer

Finally, the physical layer 44 is concerned with the physical and electrical connections or interfaces between the first computer 15*a* and the ATM switching network 12. The physical layer 44 provides the link layer 42 with a means of transmitting a serial bit stream between the communicating computers 15*a*, 15*b* (remote computer B not shown).

Figure 4:
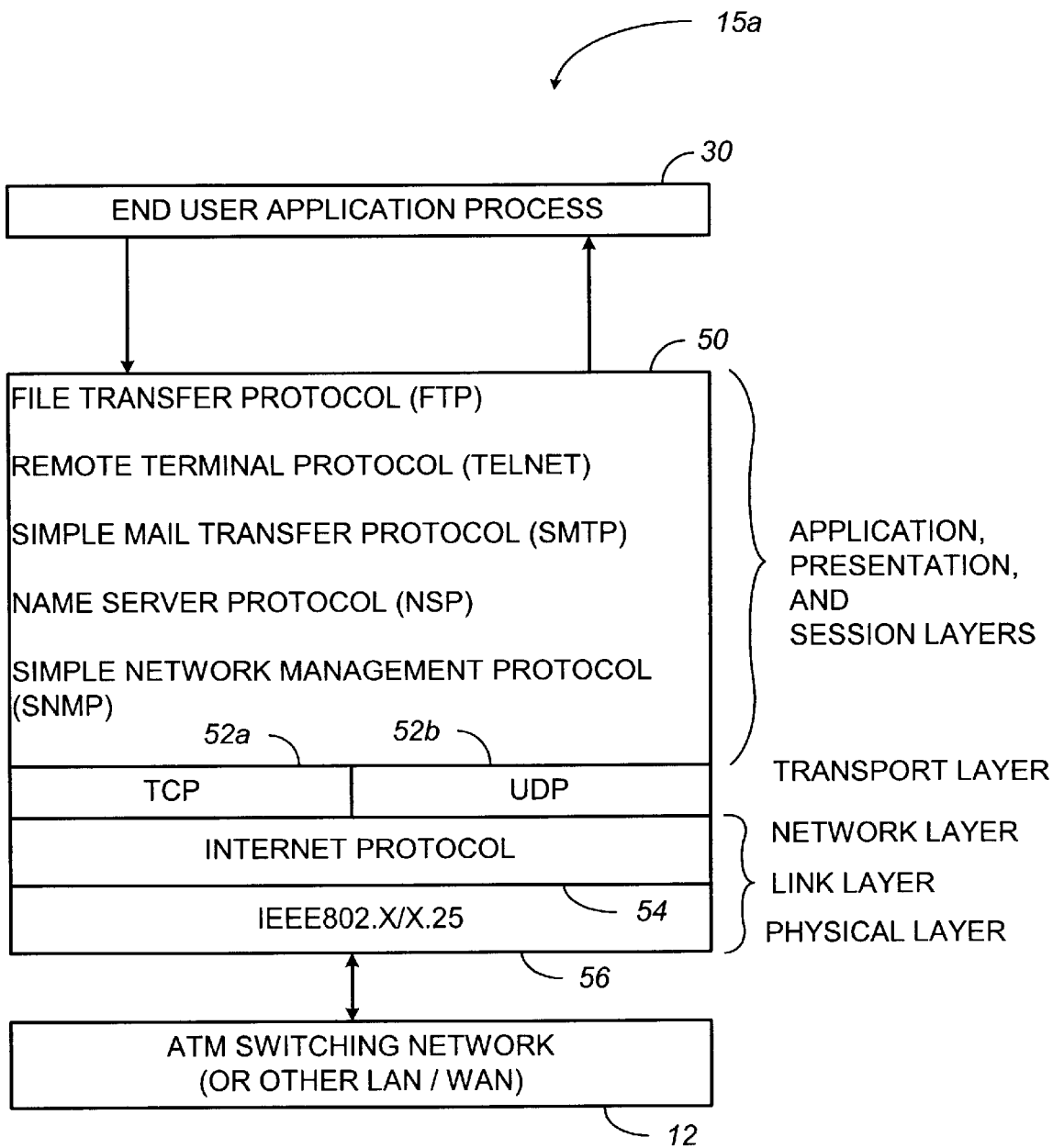
FIG. 4 is a schematic diagram illustrating the relationship between several popular data transmission protocols and the various OSI layers of FIG. 2.

Having described both the ISO reference model for OSI with regard to FIG. 2, and the seven protocol layers of the reference model with regard to FIG. 3, reference is now directed to FIG. 4. In this regard, FIG. 4 is a diagram illustrating the relationship between the seven OSI layers and the currently popular TCP/IP for data transfers between end-user application processes 30 on the Internet and private networks.

The TCP/IP suite may be summarized as illustrated in FIG. 4. As in the OSI reference model previously described with regards to FIGS. 2 and 3, the TCP/IP serves to enable data transfers between an end-user application process 30 operative on a first computer 15*a* and a remotely located computer 15*b* (not shown) coupled to an ATM switching network 12 or other local area network (LAN) or wide area network (WAN). It will be appreciated by those skilled in the art that the multi-node ATM switching network 12 of FIG. 1 may be used as the backbone of a WAN. The TCP/IP includes both network-oriented protocols and application support protocols. FIG. 4 shows some of the standard protocols supported along with their relation to the seven protocol layers of the OSI reference model.

As illustrated in FIG. 4, the file transfer protocol (FTP), the remote terminal protocol (TELNET), the simple mail transfer protocol (SMTP), the name server protocol (NSP), and the simple network management protocol (SNMP) are representative protocols provided by the TCP/IP suite 50. As is further illustrated in FIG. 4, the aforementioned protocols relate to the application, presentation and session layers 32, 34, and 36 of the OSI reference model previously described with regards to FIGS. 2 and 3.

As shown in FIG. 4, a TCP 52*a* resides at the transport layer 40 (see FIG. 3) of the ISO reference model along with a user datagram protocol (UDP) 52*b*. As further illustrated in FIG. 4, an Internet protocol (IP) 54 resides below the transport layer 40 and relates to the lowest three levels of the ISO reference model. Below the IP 54 resides a set of joint physical connection standards herein designated as IEEE802.X/X.25 56 that define the physical interconnections for existing switched data networks 10 (FIG. 1) or alternatively, the ATM switching network 12.

It is important to note that since TCP/IP was developed concurrently with the ISO initiative to develop an OSI standard, TCP/IP does not contain specific protocols related to all of the seven OSI reference model layers. Nevertheless, most of the functionality associated with the ISO reference model layers is embedded within the suite of protocols illustrated in FIG. 4.

Figure 5:
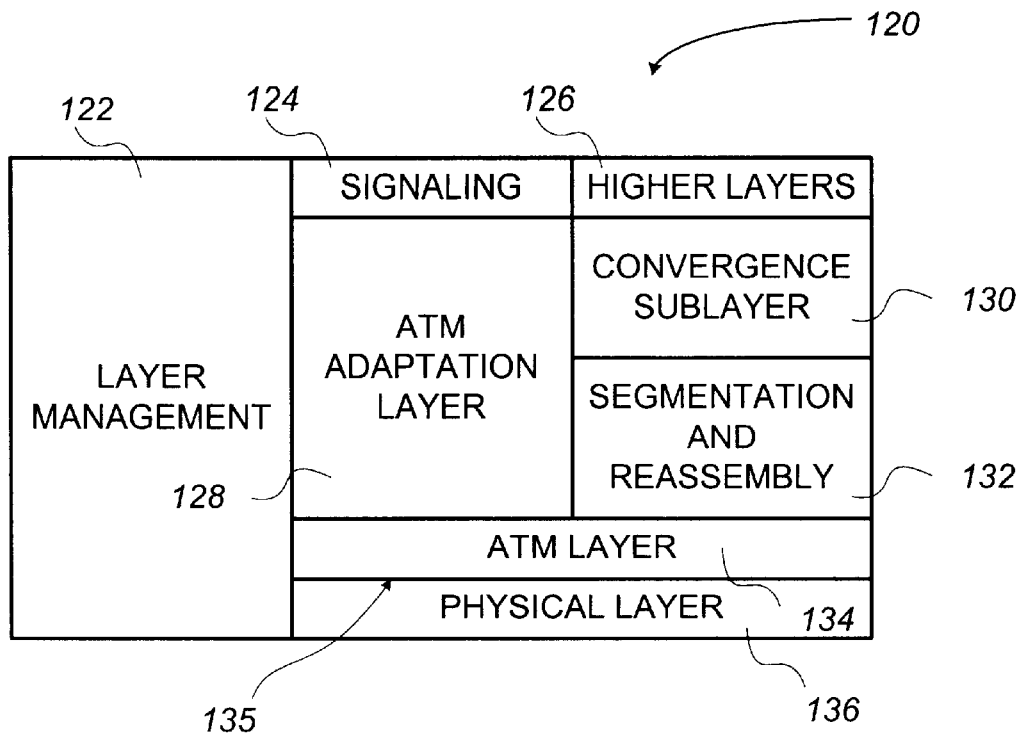
FIG. 5 is a schematic diagram illustrating the broadband integrated services digital network (B-ISDN) protocol reference model as may be applied to the multi-node ATM switching communications system of FIG. 1.

Having described both the relationship between the seven ISO reference model layers with the TCP/IP suite for data transfers between end user application processes 30 on the Internet with regard to FIG. 4, reference is now directed to FIG. 5. FIG. 5 is a diagram illustrating a broadband integrated services digital network (B-ISDN) protocol reference model. A B-ISDN is an all purpose digital network to facilitate worldwide information exchange between any two subscribers without limitations introduced or imposed by either the medium or the data to be transferred. ATM is the transport mode of choice for B-ISDN. ATM is a connection-oriented packet-switching technique that uses a 53-byte fixed size cell to transfer information via a network. The short packet size of ATM, at high transmission rates, offers the flexibility to provide a wide range of services required by different end-user applications. The term asynchronous indicates that the cells generated by a source may appear at irregular intervals in the network. The connection-oriented nature of ATM arises out of the need to reserve resources in the network to meet the QoS requirements of end-user applications 30.

As illustrated in FIG. 5, the B-ISDN protocol reference model 120 comprises layer management 122, a signaling layer 124, higher layers 126, an ATM adaptation layer 128, an ATM layer 134, and a physical layer 136. The ATM adaptation layer 128, as illustrated in FIG. 5, may be further described as comprising both a convergence sublayer 130 and a segmentation and reassembly (SAR) sublayer 132. As also illustrated in FIG. 5, an interface 135 may be present between the ATM layer 134 and the physical layer 136. A well-known interface 135 between the ATM layer 134 and the physical layer 136 is the universal test and operations physical interface for ATM (UTOPIA). The UTOPIA interface 135 is the standard interface defined by the ATM forum between the physical layer 136 and the ATM layer 134 devices.

The signaling layer 124 and the higher layers 126 illustrated at the uppermost levels in the ATM protocol may be further described as a user layer. Thus the B-ISDN protocol reference model of FIG. 5 can be described as comprising a physical layer 136, an ATM layer 134, an ATM adaptation layer 128, and a user layer (comprising the signaling layer 124 and the higher layers 126). The physical layer 136 transports cells between two ATM entities (i.e., a first computer 15a and a remote computer 15b). It guarantees, within a certain probability, cell header integrity and merges user cells to generate a continuous bit stream across a physical transport medium. The ATM layer 134 transfers fixed size ATM cells between the users of the ATM layer 134 by preserving the cell sequence integrity. The ATM layer 134 includes the following: cell structure and encoding; message traffic control; services provided to the ATM adaptation layer 128; and services expected from the physical layer 136.

The ATM layer 134 deals with the functions of the cell header independent of the type of information carried in the cell. Thus simplicity and flexibility are achieved by omitting various services required by end-user application processes 30 (see FIGS. 2–4). In particular, the ATM layer 134 does not provide information on the frequency of the service clock, detection of erroneously inserted cells, detection for lost or omitted cells, means to determine and handle cell delay variation (CDV), and awareness of the content of the user information.

The main reason for not providing these services at the ATM layer 134 is that not all end-user application processes 30 (see FIG. 4) require these services. By way of example, data traffic does not require information on the frequency of the service clock, whereas, voice encoded data may require awareness on the contents of the information. Accordingly, the functionality required by various data services are grouped into a small number of classes that are supported by different ATM adaptation layers 128.

There are four service classes, as well as, a user defined class of service. Class A corresponds to services that require a constant bit rate (CBR) connection. Class A services require timing synchronization between the source and the destination nodes. Two examples are 64 kb/s pulse code modulation (PCM) voice and CBR video. Class B corresponds to a variable bit rate (VBR) connection-oriented service. Class B services also require a timing relation between the source and the destination nodes. VBR encoded video is an example of a data service which falls into the B service class. Class C corresponds to VBR connection-oriented service with no timing relation between the source and the destination node. A typical service within the C service class is a connection-oriented data transfer. Class D corresponds to a VBR connectionless service with no timing relation between the source and the destination node. Connectionless data transfer between two LANs over a WAN, such as the Internet, is an example of a class D type service. Class X service is a raw cell service to allow for proprietary vendor-defined ATM adaptation layers 128.

As introduced herein above, the ATM adaptation layer 128 further comprises a convergence sublayer (CS) 130 and a segmentation and reassembly (SAR) sublayer 132. A transmit node SAR sublayer 132 receives CS-protocol data units (CS-PDUs) and segments them, or collects in the case of CBR services, so that when a SAR header/trailer is added to the PDU, the final payload fits into one ATM payload portion of 48 bytes. On the receiving end, the SAR sublayer 132 reconstructs the CS-PDUs from received cells and passes them to the CS sublayer 130. The CS sublayer 130 is further divided into a common portion and a service specific portion (not shown). The common portion of the CS sublayer 130 performs functions common to a particular ATM adaptation layer 128 class of users. The service specific requirements of different classes of users, for example, timing recovery for real-time applications, are implemented in the service specific portion of the CS sublayer 130. For services that do not require any specific function, the service specific portion may be null.

CBR services in the ATM framework are assumed to require a timing relationship between the end nodes. VBR services, on the other hand, are further classified into two subcategories depending upon whether an end-to-end timing relationship is required. The former classification is intended for applications such as VBR video and audio. The latter classification is for data services. These data-service applications may be further classified based on those that require a connection-oriented data transfer and those that transfer data via a connectionless application service.

Figure 6:
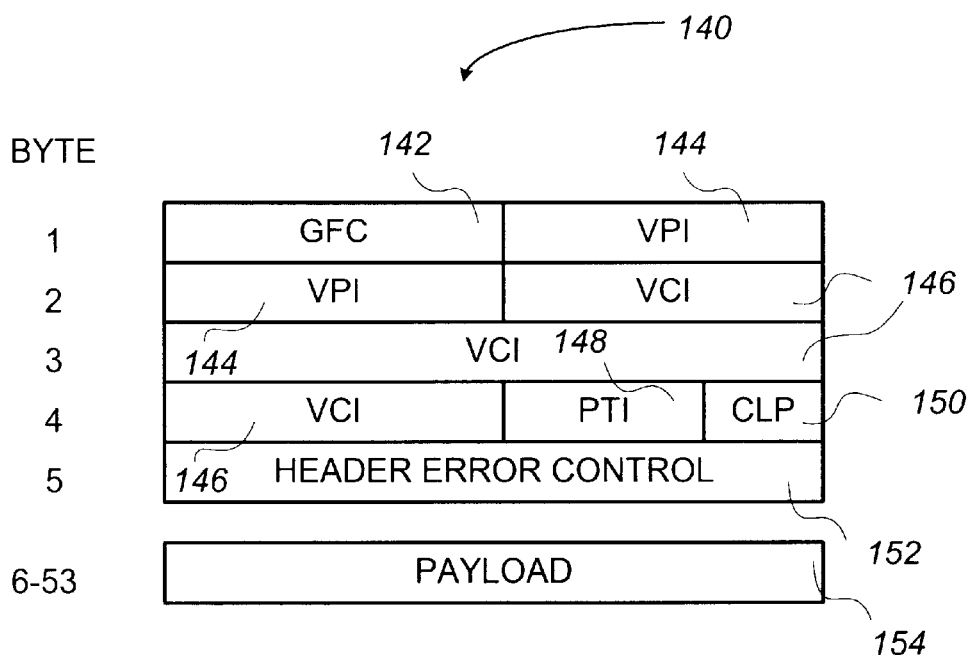
FIG. 6 is a schematic diagram illustrating the cell format of a transmission mode of choice, asynchronous transfer mode (ATM), for cell data transfer in the B-ISDN represented in the protocol reference model of FIG. 5.

Having described the B-ISDN protocol as illustrated in FIG. 5, along with ATM layers and service classes, reference is now directed to FIG. 6. In this regard, FIG. 6 illustrates the ATM cell format. As illustrated in FIG. 6, an ATM cell 140 comprises 53 bytes, with the first five bytes forming a cell header and the remaining 48 bytes a payload 154. As further illustrated in FIG. 6, the ATM cell header comprises a first byte consisting of two fields, a generic flow control (GFC) field 142 and a virtual path identifier (VPI) 144. The second byte of the ATM cell header also contains two fields, a second portion of the VPI 144 and a first portion of a virtual channel identifier (VCI) field 146. The third byte of the ATM cell header comprises a second portion of the VCI 146. The fourth byte of the ATM cell header comprises a third portion of the VCI 146, a payload type identifier (PTI) field 148, and a cell loss priority (CLP) field 150. The fifth and last byte of the ATM cell header comprises a header error control field 152.

The GFC field 142 is a 4-bit field providing flow control and fairness at a user-network interface. It is not used to control data traffic in the other direction, that is, network to user traffic flow. The GFC field 142 has no use within the ATM switching network 12 (see FIG. 1) and is intended for use by access mechanisms that implement different access levels and priorities.

ATM data transfers require established connections prior to initiating and completing a data transfer. ATM uses routing tables at each node 13 (FIG. 1) along the path of a connection that maps the connection identifiers from the incoming links to the outgoing links. There are two levels of routing hierarchies, virtual paths (VPs) and virtual channels (VCs). A VC uses a unique identifier used to describe the unidirectional transport of cells from one end user to a remotely located end user (i.e., a first computer 15a and a remote computer 15b). A VP is a collection of one or more VCs between two nodes. Each VP has a bandwidth associated with it limiting the number of VCs that can be multiplexed on the VP. VPIs are used to route packets between two nodes that originate, remove, or terminate the VPs, whereas, VCIs are used at these end nodes 13 (FIG. 1) to distinguish between individual connections. It is significant to note that there is no difference between a VP and a VC when a VP is defined over a single physical link. When a VP is defined over two or more physical links, it reduces the size of the routing tables by allowing a number of VCs to be switched based upon a single identifier, that is, a VPI 144.

The PTI field 148 defines what is transmitted in the cell payload. The CLP field 150 of the ATM cell header is a 1-bit field that provides limited flexibility by defining two cell-loss priorities. The header error control field 152 is used mainly to discard cells with corrupted ATM cell headers and to delineate ATM cells 150. Where cell delineation is the process of determining the cell boundaries from the received bit stream. The 8-bit field provides single-bit error correction and a low probability of corrupted cell delivery capabilities.

A possible end-to-end model for data communications using a xDSL data transfer medium, where xDSL is an acronym designated to encompass the group consisting of but not limited to ADSL, RADSL, integrated services digital network DSL (IDSL), multi-rate symmetric DSL (MSDSL), HDSL, HDSL2, and further including discrete multi-tone heavy (DMT.heavy) and DMT-G.Lite may consist of TCP/IP running on top of PPP, which may run on top of ATM. The QoS and VC flexibility inherent in ATM permits a single user access to many different data sources simultaneously. By way of example, a single user may surf the net (time insensitive), download a software application (time/order sensitive), listen to a web radio station (time sensitive), and check corporate electronic mail (time insensitive) by accessing a virtual private network. Ideally, a single user could have multiple open "windows" or active applications each of which may be connected to a separate VC with each of the aforementioned data services received and transmitted via logically separate data streams through the xDSL interface to a remote device.

Figure 7:
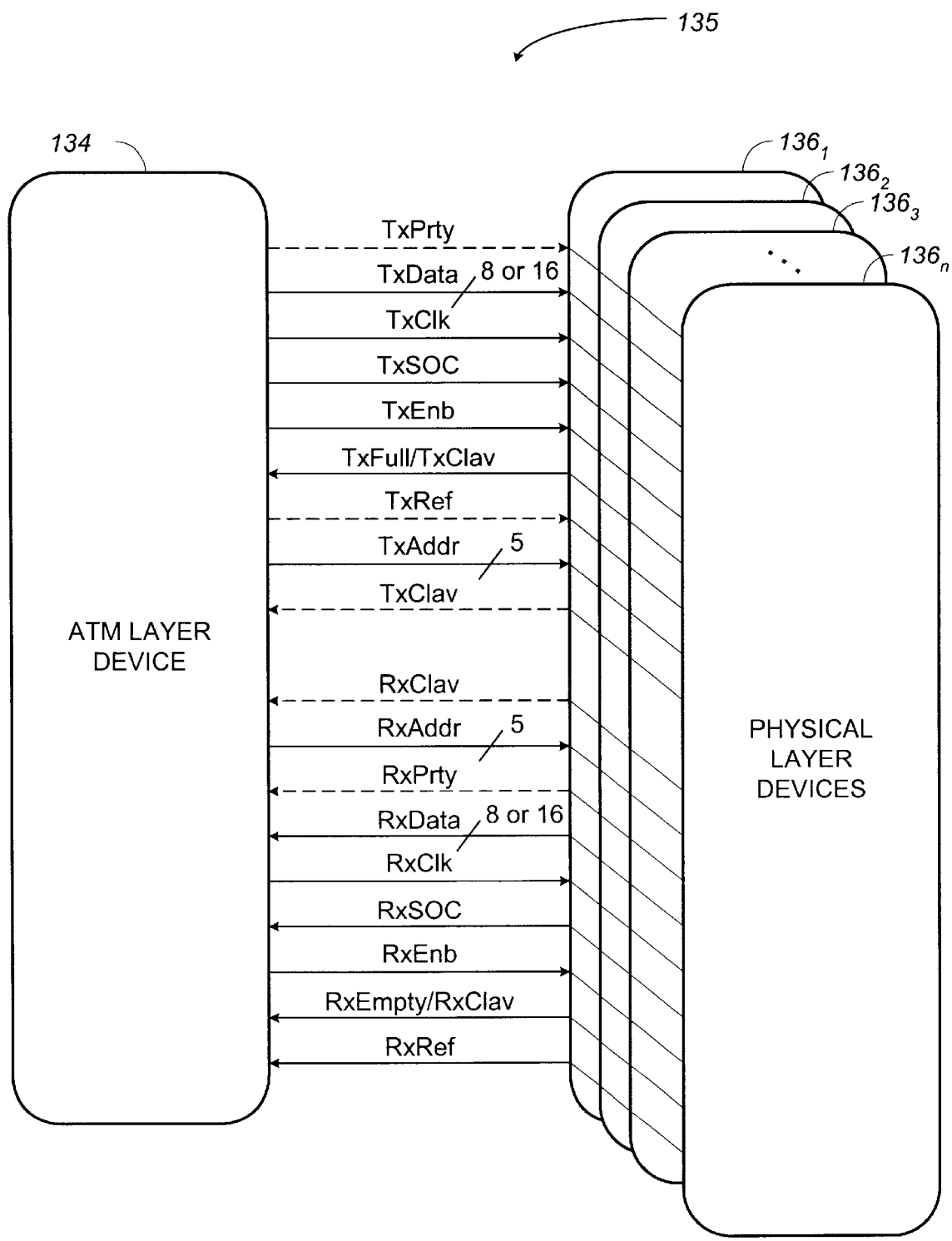
FIG. 7 is a functional block diagram illustrating the physical connections in an UTOPIA Level 2 interface between an ATM layer device and a plurality of physical layer devices as may be found at each of the network nodes 1 through 5 in the multi-node ATM switching communications system of FIG. 1.

Having described the ATM cell format with regard to the schematic of FIG. 6, reference is now directed to FIG. 7, which further illustrates the interface 135 between an ATM layer 134 and physical layer 136 devices. As illustrated in FIG. 7, the interface 135 between an ATM layer 134 and a plurality of physical layer 136 devices may comprise up to 31 addressable units as described in the UTOPIA Level 2 standard. As illustrated in FIG. 7, the interface 135 may comprise a plurality of defined transmit and receive signals. Multiple physical layer devices $136_1, 136_2, 136_3, \ldots, 136_N$, may communicate with the ATM layer device 134 through the use of the transmit and receive enable signals, herein labeled "TxEnb" and "RxEnb" in accordance with the UTOPIA Level 2 standard and the 5 conductor transmit and receive address lines "TxAddr" and RxAddr," respectively. As illustrated in FIG. 7, the transmit enable signal traverses the interface 135 from the ATM layer device 134 to the plurality of physical layer devices 136 and the receive enable signal traverses the interface 135 in the opposite direction.

ATM cell transfers across the interface 135 may be performed with a cell level handshake as described below. The transmit and receive address lines may be used to poll and select the various physical layer devices $136_N$. When the transmit or receive enable signals are active (i.e., a transfer is underway), the corresponding address lines function as a polling address. The physical layer device 136 with an identification number equal to the number presented on the address lines may relay its current status to the ATM layer device 134 via the corresponding "Clav" signal during the next clock cycle. When the transmit or receive enable signals are inactive, the last value on the corresponding address lines selects the physical layer device $136_N$ that will be the active device for the next cell transfer. In accordance with the UTOPIA Level 2 standard, the address that would identify physical layer device $136_{32}$ is reserved to identify a pseudo NULL device. There is always at least one polling to the NULL device between polling of real physical layer devices $136_N$, this full bus turnaround cycle is introduced in order to avoid data bus conflicts between the different physical layer devices 136. It will be appreciated that the choice of this data bus address scheme limits the number of addressable physical layer devices 136 at the interface 135 to 31 addresses.

In light of the foregoing, the invention is a system and a method for extending the number of addresses on a data bus without modifying the number of address bits (address lines) used to identify the various physical layer devices on the data bus. An ATM network node configured with a data bus extender in accordance with the present invention may achieve an overall higher level of data transfer efficiency by increasing the number of addressable physical layer transport devices that may communicate with an ATM layer device. It is significant to note that the number of address bits increases in relation to the total address range only at the master side of the interface whereas the same number of address bits may identify each particular address at the slave side of the interface.

Figure 8:
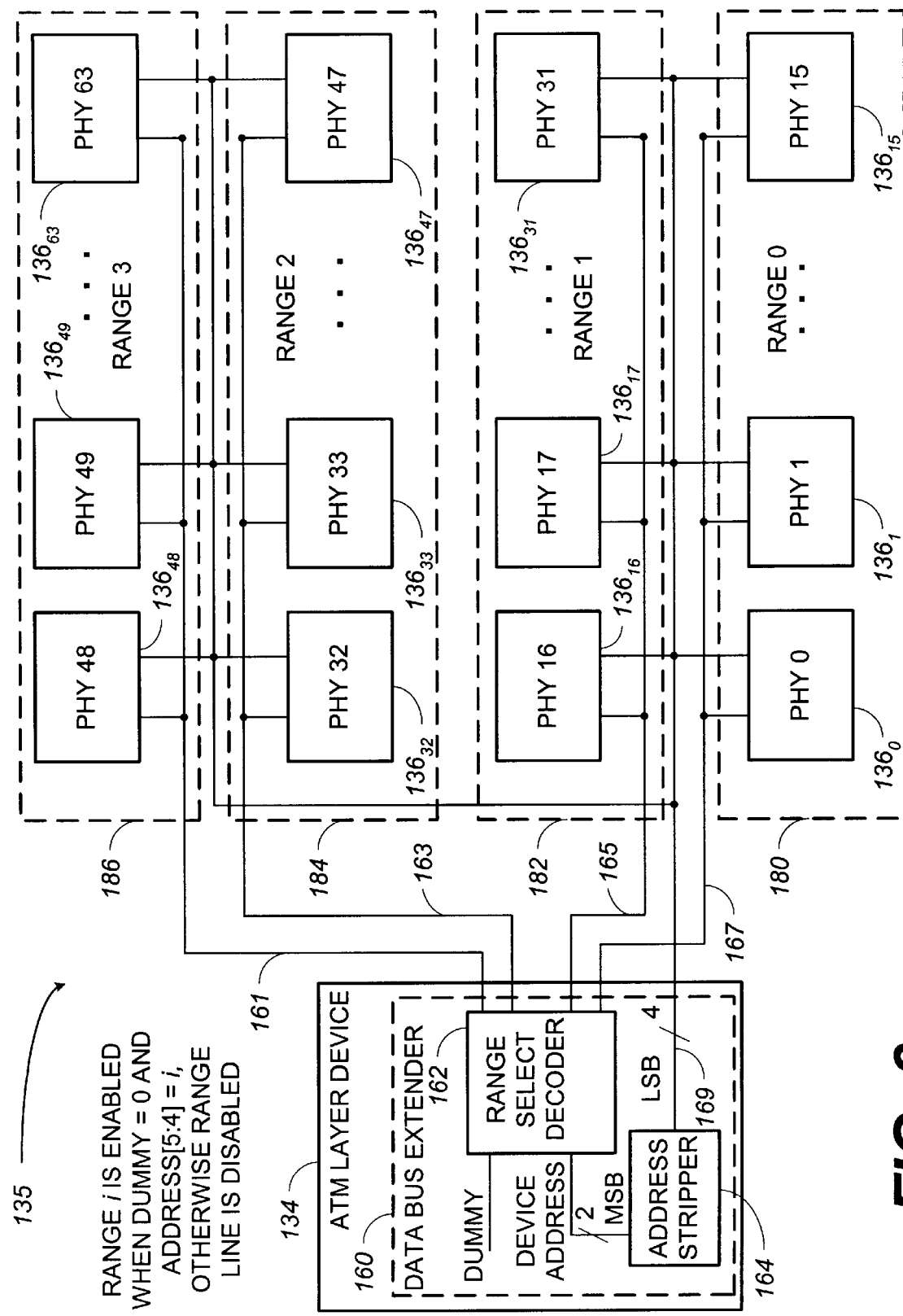
FIG. 8 is a functional block diagram that illustrates an improved network node in accordance with the present invention.

Turning now to the drawings focusing on illustrating the data bus extender of the present invention, reference is directed FIG. 8, which presents a functional block diagram of an exemplary interface 135 between a single ATM layer device 134 and 64 physical layer devices 136 each separately addressable with 5 address lines. As illustrated in FIG. 8, a data bus extender 160 may be integrated with the ATM layer device 134 in order to address more physical layer devices 136 than previously possible with the UTOPIA Level 2 standard. As further illustrated in FIG. 8, a data bus extender 160 in accordance with the present invention may comprise a range select decoder 162 and an address stripper 164. It will be appreciated that in order to address 64 separately identifiable physical layer devices 136, six address bits should be provided at the ATM layer device 134. Instead of simply forwarding the contents of the six address bits onto a six channel address bus to separately select 64 addressable devices, the data bus extender 160 may be configured to intercept the six address bits at the address stripper 164. As also illustrated in FIG. 8, the address stripper 164 may be configured to separate the two most significant bits of the six-bit address for application at input of the range select decoder 162. As further illustrated in the exemplary interface 135 of FIG. 8, the address stripper 164 may simply provide the four least significant bits of the 6 bit address to each of the 64 addressable physical layer devices 136 via address bus 169.

The range select decoder 162 may be configured to receive the two most significant bits of the physical device address from the address stripper 164 at a first input. As illustrated in FIG. 8, the range select decoder 162 may be configured to receive a "Dummy" signal at a second enable input that may correspond to a NULL physical device as previously explained to avoid bus conflicts between the various physical layer devices 136. The range select decoder 162 may be configured to select one of the four ranges 180, 182, 184, and 186, herein labeled, "Range 0," "Range 1," "Range 2," and "Range 3, respectively in accordance with the following algorithm. Each of the range address lines 161, 163, 165, and 167 that may exit the range select decoder 162 and corresponding to "Range 3," "Range 2," "Range 1," and "Range 0," respectively, may be selected when the Dummy line is disabled and the most significant bits of the six bit address lines identify a physical layer device falling within that particular range Y. For example, for the case where the six bit physical layer address at the ATM layer device 134 is represented by "101110" indicating physical layer device PHY 46 $136_{46}$, the address stripper 164 of the data bus extender 160 may forward "1110" on the four line address bus 169, thus indicating that the $14^{th}$ addressable physical layer device 136 should be selected in range Y. As previously described, the address stripper 164 may forward "10" to the range select decoder 162. In accordance with the range select decoder algorithm introduced above, Range 2 will be selected by enabling range address line 163 when the Dummy line is disabled. As shown in the schematic diagram of FIG. 8, physical layer device PHY 46 $136_{46}$ is the $14^{th}$ addressable physical layer device in Range 2 184. Thus, physical layer device PHY 46 $136_{46}$ may be selected by a data bus extender 160 in accordance with the present invention while using a 5 line address bus to select each of the physical layer devices $136_N$. It will be appreciated by those skilled in the art that a data bus extender 160 in accordance with the present invention provides the capability to extend the addressing range without modifying the slave (i.e., physical layer devices) as the same number of address lines may be used to separately select an increased number of addressable devices. In addition it will be appreciated that the data bus extender increases the address range without introducing undue complexity at the ATM layer device 134.

Figure 9:
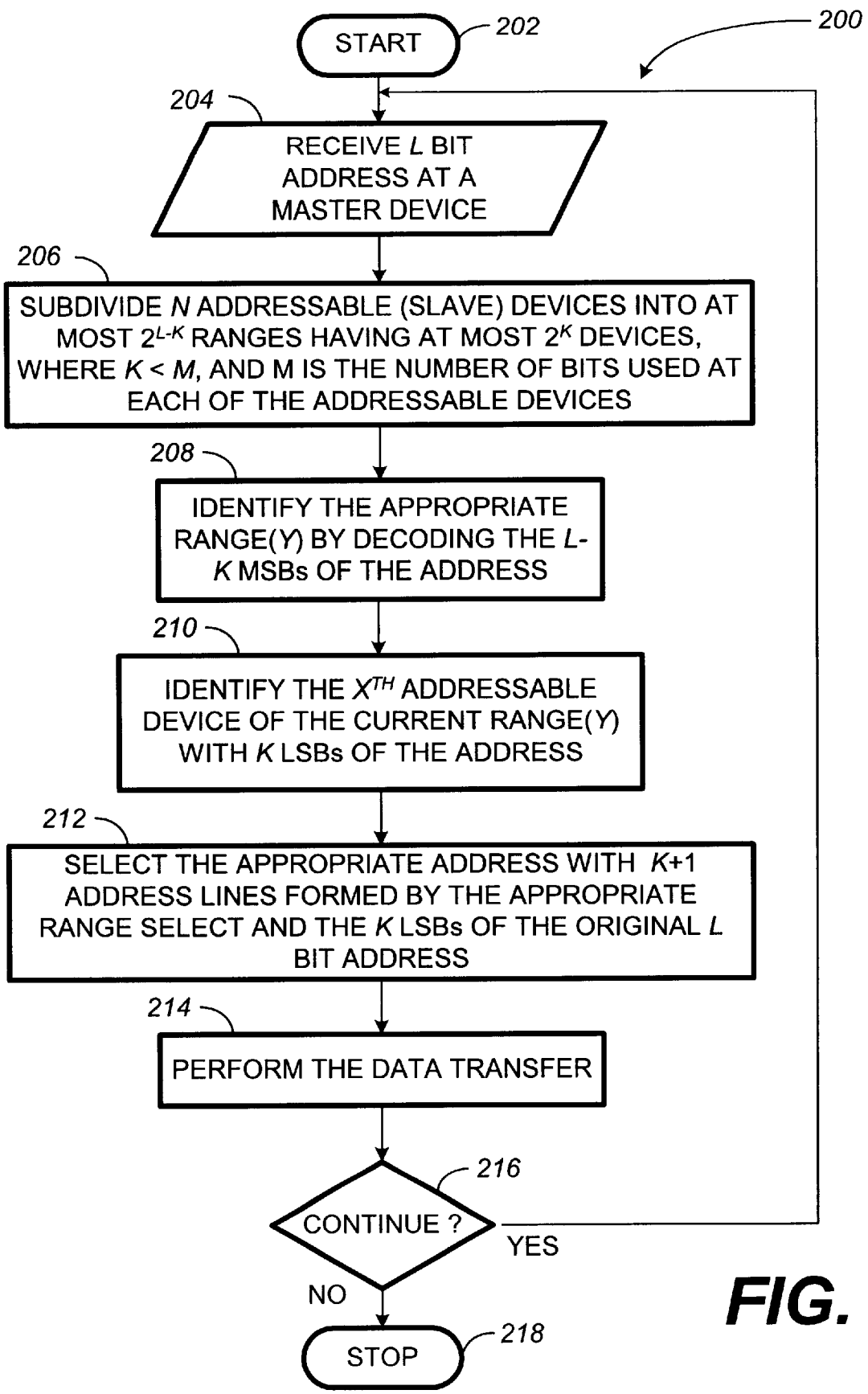
FIG. 9 is a flowchart illustrating a method for extending the number of physical layer devices on a data bus that may be performed by the improved network node of FIG. 8.

Having introduced and described a data bus extender 160 with relation to the exemplary interface 135 configuration of FIG. 8, reference is now directed to FIG. 9, which presents a flowchart illustrating a method for extending the number of addresses on a data bus that may be performed by the data bus extender 160 of FIG. 8. In this regard, a method for extending the number of addresses on a data bus 200 may begin with step 202, herein designated as "Start." Next, in step 204, the method for extending the number of addresses on a data bus 200 may receive an L-bit address at a master device. The method for extending the number of addresses on a data bus 200 may proceed by subdividing N addressable (slave) devices into Y ranges where $Y=2^{L-K}$ with each range having a maximum of $2^K$ addresses as illustrated in step 206. As indicated in step 208, the method for extending the number of addresses on a data bus 200 may identify the appropriate range by decoding the L–K most significant bits of the address. Next, in step 210, the method for extending the number of addresses on a data bus 200 may select the $X^{Th}$ addressable slave device of the current identified range (Y) with the remaining K least significant bits of the address. Having identified an appropriate range(Y) and the appropriate device within that range in steps 208 and 210 respectively, the method for extending the number of addresses on a data bus 200 may select the appropriate address by enabling the appropriate range and device address lines as illustrated in step 212. With the proper device identified on the (K+1)-address lines, the data transfer may then be performed as indicated in step 214.

Those skilled in the art will appreciate that any of a number of criteria may be selected as the critical criteria for the determination of whether to continue as illustrated by the prompt of step 216, labeled, "Continue?" As illustrated in the flowchart of FIG. 9, if the determination in step 214 is affirmative, the method for extending the number of addresses on a data bus 200 may repeat steps 204 through 214 as introduced and described above. Otherwise, if the determination in step 216 is negative, the method for extending the number of addresses on a data bus 200 may be configured to terminate as indicated in step 218, herein labeled, "Stop."

Any process descriptions or blocks in the flow chart of FIG. 9 should be understood to represent modules, segments, or portions of code which include one or more executable instructions for implementing specific logical functions or steps in the process extending the number of addresses on a data bus 200. Alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. For example, steps 208 and 210 may be performed substantially simultaneously or in any order as desired. The only limitation is that steps 208 and 210 must be completed prior to performing a data transfer in step 214.

It will be appreciated that the method for extending the number of addresses on a data bus 200 in accordance with the present invention may comprise an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It will be appreciated by those skilled in the art that the data bus extender 160 in accordance with the present invention can be implemented in hardware, software, firmware, or a combination thereof. In the preferred embodiment(s), the data bus extender 160 is implemented in hardware at a master data bus device (e.g., an ATM network node 13 (FIG. 1)). As is well known and appreciated by those skilled in the art, the data bus extender 160 can implemented with any or a combination of the following technologies: a discrete logic circuit(s) having logic gates for implementing logic functions upon data signals, an application specific integrated circuit (ASIC) having appropriately configured logic gates, a programmable gate array(s) (PGA), a field programmable gate array (FPGA), etc.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

Therefore, having thus described the invention, at least the following is claimed:

1. A data bus addressing device, comprising:
an address bit-stripper configured to receive an address identifying a particular addressable slave device, the address bit-stripper also configured to generate a first output signal responsive to a first portion of the address, the address bit-stripper further configured to generate a second output signal responsive to a second portion of the address; and
a range select decoder configured to receive the address bit-stripper first output signal and an enable signal, the range select decoder further configured to selectively enable a plurality of range select decoder outputs in response to the address bit-stripper first output signal and the enable signal.

2. The device of claim 1, wherein the data bus is subdivided into a plurality of ranges, each range comprising at least one addressable device integrated on the data bus.

3. The device of claim 2, wherein the plurality of range select decoder outputs each corresponds to an identifiable range of the data bus.

4. The device of claim 2, wherein the address bit-stripper second output comprises a plurality of address lines used to selectively identify an addressable device within a range.

5. The device of claim 4, wherein a selectively identified addressable device within a range is combined with the range select decoder output to identify a particular addressable device on the data bus.

6. The device of claim 1, wherein the plurality of range select decoder outputs comprise at least one address line used to select devices integrated on the data bus.

7. The device of claim 1, wherein the data bus is configured to perform data transmissions via an asynchronous transfer mode (ATM) data transfer protocol.

8. A data bus addressing device, comprising:
a master device configured to appropriately send and receive at least one data signal from a plurality of remotely located and communicatively coupled addressable slave devices, wherein the master device forwards a plurality of address signals identifying an address to each of the slave devices and a slave corresponding to the forwarded address sends and receives the at least one data signal; and
a data bus extender configured to divide the plurality of address signals such that a first portion of the address signals is decoded by the master device and forwarded as at least one of the plurality of address signals sent to the slave devices.

9. The data bus of claim 8, wherein the data bus extender appropriately identifies a particular slave device without requiring an increase in the number of address ports at each of the addressable slave devices.

10. The data bus of claim 8, wherein the data bus extender receives an L-bit address signal and outputs less than L address signals capable of separately identifying a maximum of $2^L$ addresses.

11. The data bus of claim 10, wherein the K+1 address signals are configured to appropriately identify $2^K$ addressable slave devices within at most $2^{L-K}$ ranges.

12. The data bus of claim 8, wherein the master device is an ATM layer device.

13. The data bus of claim 8, wherein at least one of the plurality of addressable slave devices is a physical layer device.

14. The data bus of claim 13, wherein the physical layer device is a xDSL transceiver.

15. The data bus of claim 8, wherein the first portion of the address signals decoded by the master device defines a sub-portion of the set of all addressable slave devices.

16. A data bus addressing device, comprising:
means for dividing a plurality of addressable slave devices into a plurality of selectable ranges;
means for identifying a specific range in which a particular addressable slave device resides on the data bus;
means for identifying a relative address position of a particular addressable slave device within the identified range; and
means for combining the identified range and the identified relative address position to identify a specific addressable slave device for communicating with a master device.

17. The device of claim 16, wherein the means for identifying a specific range comprises an address decoder.

18. The device of claim 16, wherein the means for identifying a relative address position comprises an address bit-stripper.

19. The device of claim 16, wherein the means for combining the identified range and the identified relative address of a slave device comprises a plurality of address signals.

20. The device of claim 19, wherein at least one of the address signals comprises an output of an address decoder.

21. The device of claim 19, wherein the number of total addressable slave devices increases while the number of address signals on the data bus remains constant.

22. A method for increasing the number of addresses on a data bus, comprising:

receiving an address at a master device;

dividing a plurality of addressable slave devices into a plurality of ranges;

identifying an appropriate range in response to a first portion of the address;

identifying a particular device within the identified range responsive to a second portion of the address; and selecting an uniquely identified addressable slave device by enabling a plurality of address lines coupling the master device to the plurality of addressable slave devices.

23. The method of claim 22, wherein the step of identifying an appropriate range comprises stripping a plurality of the most significant bits of the address and decoding the stripped bits to identify a corresponding range.

24. The method of claim 23, wherein the step of identifying a particular device within the identified range comprises stripping a plurality of the least significant bits of the address.

25. The method of claim 24, wherein the number of stripped least significant bits of the address are applied to a plurality of address signals.

26. The method of claim 25, wherein the stripped least significant bits of the address are applied in a one to one ratio to the plurality of address signals.

27. A communications network, comprising:

at least one data bus configured such that it is communicatively coupled to a network node having a master device configured to appropriately send and receive at least one data signal from a plurality of remotely located and communicatively coupled addressable slave devices, wherein the master device forwards a slave device address to each of the slave devices and a slave device corresponding to the forwarded address communicates the at least one data signal; and a data bus extender configured to divide the plurality of address signals such that a first portion of the address signals is decoded by the master device and forwarded as at least one of the plurality of address signals sent to the slave devices thereby permitting the number of total addressable slave devices to increase without a corresponding increase in the number of address signals on the data bus.

\* \* \* \* \*